R. WILLIAMSON.
MACHINE FOR FORMING HOLLOW GLASSWARE.
APPLICATION FILED SEPT. 23, 1912.
1,080,742.
Patented Dec. 9, 1913.
2 SHEETS—SHEET 1.
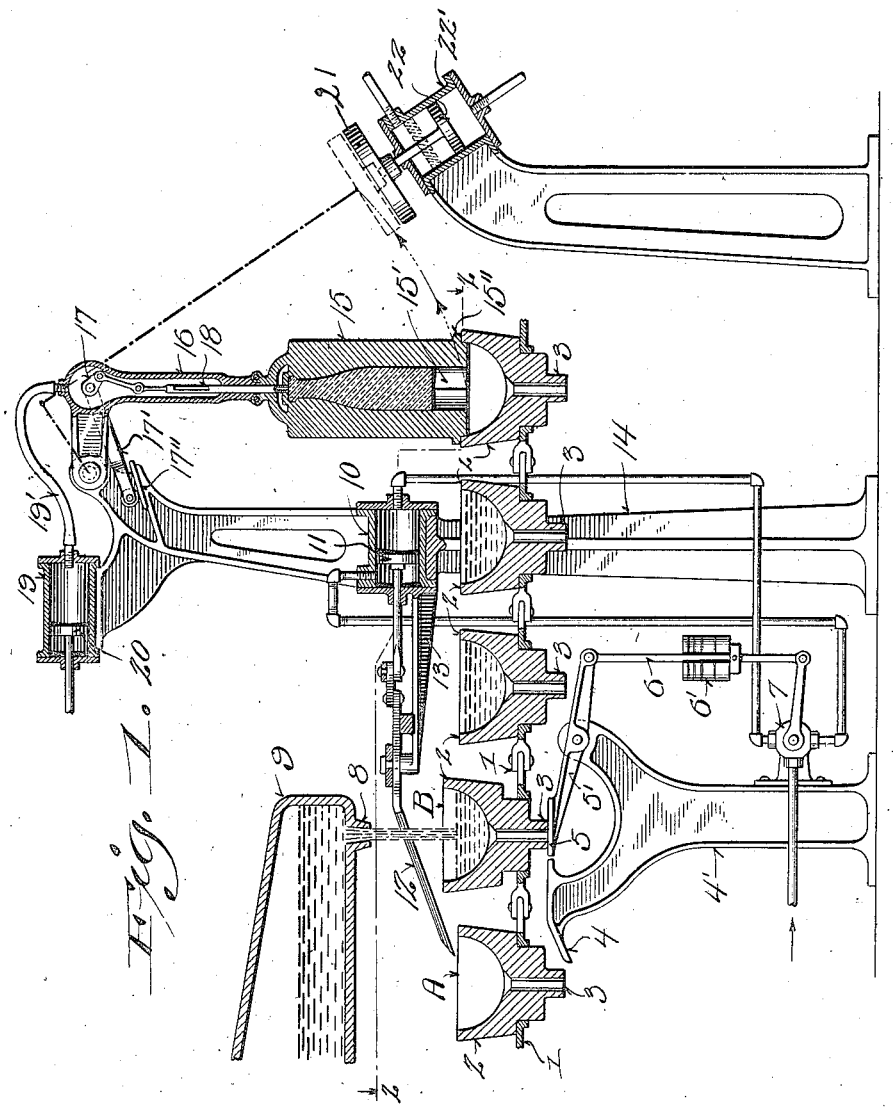

R. WILLIAMSON.
MACHINE FOR FORMING HOLLOW GLASSWARE.
APPLICATION FILED SEPT. 23, 1912.
1,080,742.
Patented Dec. 9, 1913.
2 SHEETS—SHEET 2.
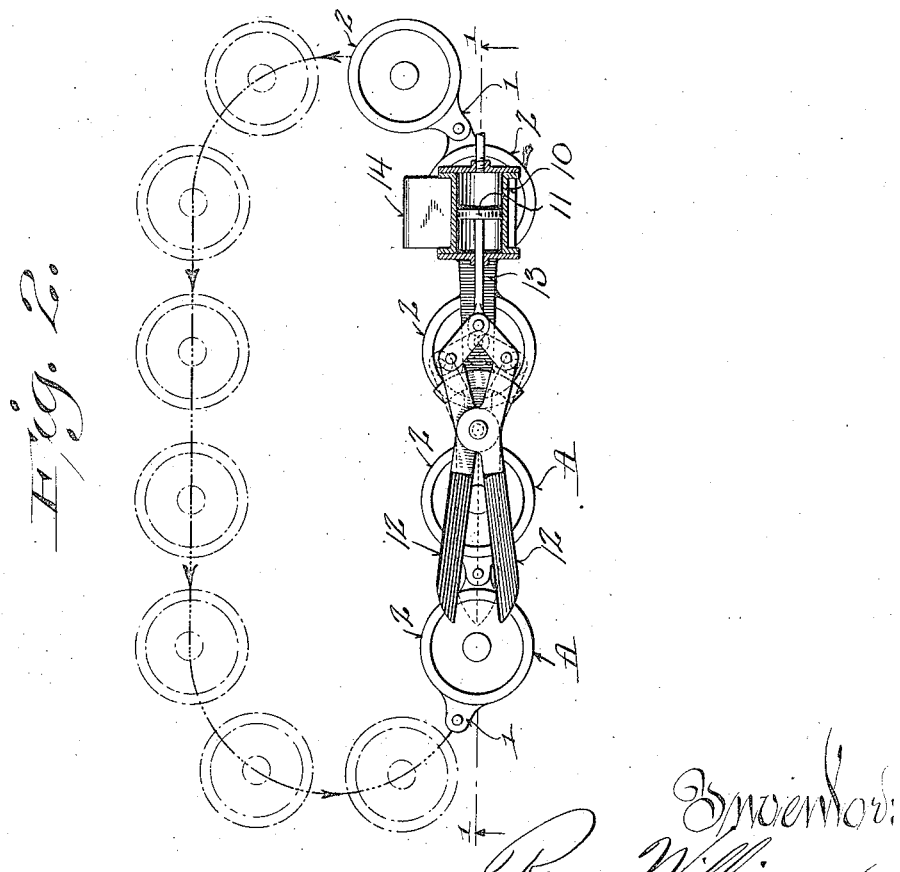

UNITED STATES PATENT OFFICE.

ROMEO WILLIAMSON, OF MILWAUKEE, WISCONSIN, ASSIGNOR TO WILLIAMSON MACHINERY COMPANY, OF MILWAUKEE, WISCONSIN.

MACHINE FOR FORMING HOLLOW GLASSWARE.

1,080,742.   Specification of Letters Patent.   Patented Dec. 9, 1913.

Application filed September 23, 1912.  Serial No. 721,988.

*To all whom it may concern:*

Be it known that I, ROMEO WILLIAMSON, a citizen of the United States, and resident of Milwaukee, in the county of Milwaukee and State of Wisconsin, have invented certain new and useful Improvements in Machines for Forming Hollow Glassware; and I do hereby declare that the following is a full, clear, and exact description thereof.

My invention has for its object to provide a simple, economical and effective machine for the manufacture of parisons to be utilized in forming various hollow glass articles, the particular object of said invention being to provide parisons of uniform area, whereby the finished articles will be accurate in their dimensions.

Specifically my invention has for its object to provide a series of shiftable hoppers adapted to be brought under a discharge nozzle of a storage reservoir and when in this position the hopper is adapted to receive a predetermined quantity of molten glass, the hopper being supported by a scale mechanism, which mechanism will automatically cut off the supply of molten glass, whereby a gather of predetermined quantity is deposited therein, thus insuring measured quantities of molten glass for each parison, the gather either being extracted from the hopper by suction or discharged therefrom by gravity into a parison mold.

With the above objects in view the invention consists in certain peculiarities of construction and combination of parts as set forth hereinafter with reference to the accompanying drawings and subsequently claimed.

In the drawings Figure 1 represents a sectional elevation in diagram illustrating a machine embodying the features of my invention, and Fig. 2, a detailed sectional plan view of the same, the section being indicated by line 2—2 of Fig. 1.

Referring by characters to the drawings, 1 represents an endless belt member, into the links of which are loosely mounted a series of hoppers 2 having vented valve-controlled stems 3 that extend from their bottoms. As illustrated in Fig. 1, the hopper-carrying mechanism is adapted to travel in the direction indicated by the arrow and the first hopper A from left to right in said view is positioned so that upon the next intermittent forward movement of the carrier mechanism its stem 3 will engage a fixed cam-plate 4, whereby said hopper will be lifted, the cam-plate constituting part of a bracket 4'. The next hopper B as shown has just traveled over the cam 4 and is at rest upon the foot 5 of a scale lever 5', one arm of which lever is connected by a link 6 to an air supply valve 7, the link 6 being provided with a series of scale weights 6', whereby the lever is held rigidly in the position shown against a stop-pin 5''. In this elevated position the hopper is alined to receive the flow of molten glass from a discharge nozzle 8 of a reservoir 9, which reservoir constitutes part of a melting furnace and forms no part of my invention.

When the gather in the hopper has arrived at a predetermined weight it is apparent that the foot end of the scale lever 5' will drop, together with the hopper. Coincident with this movement air is admitted through valve 7 by suitable pipe connections to the front end of a cylinder 10, and, as best shown in Fig. 2, this air pressure acts upon a piston 11, which piston is in link connection with shear-plates 12, the fulcrum of the same being mounted upon a suitable bracket 13 that forms part of the cylinder, it being understood that the cylinder is also suitably supported by a standard 14. The shear-plates, as shown, are slightly beveled toward each other and the stream of molten glass is adapted to travel by gravity therebetween. When the air pressure is admitted to the forward end of the cylinder, the said blades are drawn together by their connection with the piston 11, thus cutting off the supply of glass to the hopper therebelow and as the blades close one upon the other they, together form an inclined trough, whereby the stream of molten glass that is cut off from the hopper thereunder is directed into the succeeding hopper A. The flow of molten glass will then be directed into hopper A by the inclined closed shear members which now form a trough and as the mouth of the hopper A passes beyond the discharge ends of the lapped shear-blades, the said shear-blades start to open gradually toward their hinge point to thus direct a constant stream of glass into said hopper A, the discharge point of which stream thereby follows the movement of said hopper A to its point of rest. Hence it will be observed that a constant stream of molten glass is maintained, being cut off from the hopper at rest under the reservoir and deflected into the succeeding hopper. Co-incident with this movement and cut-off of the supply of glass to hopper B intermittent forward movement to the hopper-carrying belt is had. Mechanism for accomplishing the same forms no part of my invention and is therefore not shown. Hence as the weight is removed from the scale-lever 5' its return to normal will cause movement of the valve, whereby air is admitted to the rear end of the cylinder 10 and the shear-plates are again opened so that the supply of molten glass is thus discharged between said shears into hopper A to complete the gather. At a predetermined distance from the discharge nozzle 8 of the reservoir and disposed in alinement with the travel of the hoppers is a parison mold 15, the members of which are hinged to a hollow arm 16 that is fulcrumed to the standard 14.

Mounted in the hollow arm 16 is a crank 17 that is linked to a channeled plunger 18, which plunger is adapted to enter the mold cavity at a predetermined time to form a blow-hole. The crank 17 also carries an arm 17' that engages a cam-plate 17" which projects from the standard. The chambered portion of the hollow arm 16 communicates with one end of a cylinder 19 through a flexible pipe connection 19', the cylinder being provided with a reciprocative piston-head 20. The body opening 15' of the two-part mold is arranged to be centered over the series of hoppers as they are shifted into alinement therewith, the said mold being provided with a shouldered end 15" that forms a practically air-tight closure for the mouth of the hopper. Hence it will be seen that as the mold and hopper containing the measured gather of glass are coupled together that the contents of said hopper can readily be sucked into the mold cavity by suction-stroke of the piston 20. Thereafter the mold is shifted to an air-controlled closure-plate 21. This plate is connected to a piston-head 22 that is mounted in a cylinder 22', which cylinder is adapted to receive air at its ends. When the mold is brought into alinement with the closure-plate air is admitted to the outer end of the cylinder, whereby said closure-plate is securely chucked against the bottom or body end of the mold to thus shield the same. In shifting the mold to the closure-plate movement of the crank will cause the plunger to enter the neck of the parison and thus form a blow-hole therein. Thereafter the piston 20 is moved forward to thus supply air-pressure sufficient to distend the parison by its entrance thereto through the plug 18, whereby said parison is completed, it being understood that the mechanism in connection with the parison mold in its specific form forms no part of my invention and is simply diagrammatically illustrated to illustrate means for extracting the measured gathers by suction from the hoppers in succession and for blowing the parison to completion.

Attention is called to the fact that while I do not claim any particular mechanism for finishing the bottle that what I do claim and consider an important feature of my invention is that I utilize a vacuum producer or suction apparatus whereby the gather of glass is drawn up from the hopper into the parison mold the air channel being through a reciprocative mandrel 18 that is retracted entirely from the head end of the mold cavity coincident to a suction movement. Thus the head cavity of said mold is entirely filled with the gather of glass. It being further understood that I may, without departing from the spirit of my invention, shift the mold thereafter and utilize a solid mandrel for forming a blow-hole in the heretofore uninterrupted upper face of the parison head.

I claim:—

1. A machine of the character described comprising a molten glass reservoir having a flow mouth, a series of shiftable hoppers adapted to be moved successively in alinement with the hopper flow-mouth, a weight-controlled mechanism for the support of that hopper which is in alinement with the aforesaid flow-mouth, shear-blades interposed between the flow-mouth and said hopper, the shear-blades being downwardly inclined to form a trough for deflecting molten glass to the mouth of the succeeding hopper co-incident to closure of said blades and actuating means for the shear-blades under control of the hopper supporting means.

2. A machine of the character described comprising a molten glass reservoir having a flow mouth, a series of shiftable gravity-controlled vertically movable hoppers arranged to be brought into successive alinement with the flow mouth, fixed means for lifting the hoppers successively upon higher planes, a weight-controlled lever mechanism for the support of each of said hoppers in their elevated positions, shiftable inclined blade mechanism disposed between the flow mouth and alined hopper, for cutting the supply of molten glass from said alined hopper and directing the same into the succeeding hopper, actuating mechanism for the blade mechanism, and an air-supply valve under control of the weighted lever mechanism, whereby the blades are actuated.

3. A machine of the character described comprising a molten glass reservoir having a flow mouth, a series of shiftable hoppers adapted to be moved successively in alinement with the hopper flow-mouth, pivoted shear-blades having their free ends inclined downwardly interposed between the flow-mouth and said hopper, the shear-blades being adapted to close and form a trough for cutting off the molten glass from the alined hopper and deflecting the same to the succeeding hopper, and actuating means for the shear-blades.

In testimony that I claim the foregoing I have hereunto set my hand at Milwaukee in the county of Milwaukee and State of Wisconsin in the presence of two witnesses.

ROMEO WILLIAMSON.

Witnesses:
   GEO. W. YOUNG,
   M. E. DOWNEY.